(12) United States Patent
Van Der Wielen

(10) Patent No.: US 11,738,357 B2
(45) Date of Patent: Aug. 29, 2023

(54) HIGH PRESSURE NOZZLE

(71) Applicant: P. BEKKERS HOLDING B.V., Ouddorp (NL)

(72) Inventor: Dingenus Van Der Wielen, Bruinisse (NL)

(73) Assignee: P. BEKKERS HOLDING B.V., Ouddorp (NL)

( * ) Notice: Subject to any disclaimer, the term of this patent is extended or adjusted under 35 U.S.C. 154(b) by 429 days.

(21) Appl. No.: 16/763,904

(22) PCT Filed: Nov. 14, 2018

(86) PCT No.: PCT/NL2018/050766
§ 371 (c)(1),
(2) Date: May 13, 2020

(87) PCT Pub. No.: WO2019/098831
PCT Pub. Date: May 23, 2019

(65) Prior Publication Data
US 2021/0370326 A1    Dec. 2, 2021

(30) Foreign Application Priority Data

Nov. 15, 2017   (NL) .................................... 2019915

(51) Int. Cl.
*B05B 3/06*   (2006.01)
*B05B 3/00*   (2006.01)
(Continued)

(52) U.S. Cl.
CPC ................ *B05B 3/06* (2013.01); *B05B 3/002* (2013.01); *B08B 9/0433* (2013.01);
(Continued)

(58) Field of Classification Search
CPC ......... B05B 3/06; B05B 3/002; B08B 9/0433; F16C 17/105; F16C 23/048; F16C 33/6659
See application file for complete search history.

(56) References Cited

U.S. PATENT DOCUMENTS 3,437,271 A * 4/1969 Hammelmann ...... B05B 3/0413
92/33
5,964,414 A * 10/1999 Hardy ...................... B05B 3/06
428/1.6
(Continued)

FOREIGN PATENT DOCUMENTS

| CN | 107096655 A | 8/2017 |
|---|---|---|
| EP | 0218354 A1 | 4/1987 |
| EP | 2387471 B1 | 8/2014 |

OTHER PUBLICATIONS

Second Office Action issued in corresponding Chinese application No. 201880074059.1, dated Apr. 14, 2022, with English Translation.

*Primary Examiner* — Tuongminh N Pham
*Assistant Examiner* — Kevin Edward Schwartz
(74) *Attorney, Agent, or Firm* — Browdy and Neimark, PLLC

(57) ABSTRACT

A high pressure nozzle, including a longitudinal housing having a liquid inlet end and a liquid outlet end opposite to the liquid inlet end and comprising an internal channel running from the liquid inlet end to the liquid outlet end, a nozzle head support shaft, rotatably arranged partially in the internal channel and comprising a liquid channel in fluid communication with the internal channel, and a rotary nozzle head supported on the nozzle head support shaft and arranged outside the housing, wherein the rotary nozzle head is arranged to rotate about a longitudinal axis of rotation to provide a rotating spraying of liquid jetted from the rotary
(Continued)

nozzle head. The high pressure nozzle includes an axial pressure compensator arranged in the internal channel, wherein the axial pressure compensator is arranged to substantially compensate axial pressure force from liquid entering the channel at the liquid inlet end.

11 Claims, 3 Drawing Sheets

(51) Int. Cl.
  *B08B 9/043* (2006.01)
  *F16C 17/10* (2006.01)
  *F16C 23/04* (2006.01)
  *F16C 33/66* (2006.01)

(52) U.S. Cl.
  CPC .......... *F16C 17/105* (2013.01); *F16C 23/048* (2013.01); *F16C 33/6659* (2013.01)

(56) References Cited

U.S. PATENT DOCUMENTS

| | | | |
|---|---|---|---|
| 6,193,169 B1 | 2/2001 | Steinhilber et al. | |
| 7,063,274 B2* | 6/2006 | Feller | B05B 3/003 239/252 |
| 7,201,238 B2* | 4/2007 | Marvin | E21B 37/00 175/107 |
| 8,006,920 B2* | 8/2011 | Wright | B05B 3/06 134/198 |
| 8,016,210 B2* | 9/2011 | Wright | B05B 3/06 134/198 |
| 8,220,724 B2* | 7/2012 | Wright | B05B 15/18 134/198 |
| 8,544,768 B2* | 10/2013 | Wright | F16C 17/18 239/259 |
| 9,067,220 B2* | 6/2015 | Wright | B05B 3/0427 |
| 9,399,230 B2* | 7/2016 | Wojciechowski, III | B05B 13/0636 |
| 2005/0109541 A1 | 5/2005 | Marvin | |
| 2015/0196928 A1* | 7/2015 | Wojciechowski, III | B05B 13/0636 239/463 |
| 2016/0008826 A1* | 1/2016 | Schneider | B05B 3/005 188/296 |
| 2016/0067723 A1 | 3/2016 | Kolle | |
| 2016/0244959 A1* | 8/2016 | Andersen | B08B 9/0433 |

* cited by examiner

HIGH PRESSURE NOZZLE

The present invention relates to a high pressure nozzle that is used to clean surfaces, in particular inner surfaces of tubes, such as inner tubes of an heat exchanger.

EP 2 387 471 B1 discloses a high pressure rotary nozzle having a rotating shaft operating within a fixed housing wherein the of axial force which acts upon the shaft due to the liquid pressure at the shaft inlet is balanced by allowing passage of a small amount of the pressurized liquid to be bled to an area or chamber between the outside of the opposite end of the shaft and the inside of the housing where the liquid pressure can act axially in an opposing direction upon the shaft to balance the axial inlet force. The balance of axial forces is self-regulating by controlling escape of the liquid through a tapered or frusto-conical region between the shaft and housing.

A drawback of this known high pressure nozzle is that the liquid bearing requires a relatively large percentage of liquid entering the high pressure nozzle to properly balance the rotating shaft in the housing of the high pressure nozzle. As a result, substantially more liquid is required to clean an inner surface of a tube to be cleaned. In practice, 30-40% of the total liquid volume used by the high pressure nozzle may be consumed to provide an adequate liquid bearing layer between the housing and the rotating shaft.

A further drawback of the high pressure nozzle of EP 2 387 471 B1 is that the high pressure nozzle is only capable of self-regulating the axial forces within a certain range of axial forces. At the same time type different types of nozzle heads may exert substantially different axial forces on the self-balancing rotating shaft. This means that a specific structure of the self-balancing rotating shaft can only be used for a specific group of nozzle heads within a certain pressure class.

An object of the invention is to provide a high pressure nozzle that lacks one or more of the above-mentioned drawbacks, or at least to provide an alternative embodiment of a high pressure nozzle to be used in cleaning of inner surfaces of tubes.

The present invention provides a high pressure nozzle, comprising:
- a longitudinal housing having a liquid inlet end and a liquid outlet end opposite to the liquid inlet end and comprising an internal channel running from the liquid inlet end to the liquid outlet end,
- a nozzle head support shaft, rotatably arranged in the internal channel and comprising a liquid channel in fluid communication with the internal channel, and
- a rotary nozzle head supported on the nozzle head support shaft and arranged outside the housing, wherein the rotary nozzle head is arranged to rotate about a longitudinal axis of rotation to provide a rotating spraying of liquid jetted from the rotary nozzle head, characterized in that the high pressure nozzle comprises an axial pressure compensator arranged in the internal channel, wherein the axial pressure compensator is arranged to substantially compensate axial pressure force from liquid entering the channel at the liquid inlet end.

In the high pressure nozzle of the invention an axial pressure compensator is provided to compensate the axial force resulting from pressure of liquid entering the high pressure nozzle at the liquid inlet end from a high pressure source. Since the axial forces are compensated by the axial pressure compensator, the quantity of liquid required to balance the nozzle head support shaft in the housing is substantially reduced. As a consequence the total quantity of liquid that is needed to clean a specific number of tubes is also reduced. It has been found that the percentage of liquid of the total volume of liquid consumed by the high pressure nozzle to provide a sufficient liquid bearing between the housing and the nozzle head support shaft may be less than 25% of the total volume of liquid consumed by the high pressure nozzle, in some applications less than 20%.

At the liquid inlet end of the housing a liquid conduit may be connected through which the liquid is fed into the internal channel of the high pressure nozzle. The axial pressure compensator guides the liquid running through the internal channel of the housing such that the axial force resulting from the liquid entering the internal channel from an external pressure source is not transferred to the nozzle head support shaft. The axial pressure compensator will typically be designed to transfer the liquid between the housing and the nozzle head support shaft in a radial direction to prevent transfer of an axial pressure force from the liquid to the nozzle head support shaft.

Further, the compensation of the axial force by the axial pressure compensator as proposed in the present invention facilitates the use of different nozzle heads, for example nozzle heads having different exit angles for the one or more jetting channels provided in the nozzle head. The exit angles of the jetting channels may be in the range of 0 degrees to 160 degrees with respect to the axis of rotation of the nozzle head. Thus the same combination of housing, axial pressure compensator and nozzle head support shaft may be used for different types of nozzle heads including nozzle heads having an angle of less than 90 degrees with respect to the axis of rotation and nozzle heads having an angle of more than 90 degrees with respect to the axis of rotation of the nozzle head.

In an embodiment, the axial pressure compensator comprises a plurality of liquid guiding channels, an inlet opening of each liquid guiding channel being in fluid communication with the liquid inlet end of the internal channel and an outlet opening of each liquid guiding channel being in fluid communication with the liquid channel of the nozzle head support shaft.

To allow liquid to pass from the inlet end of the internal channel to the nozzle head support shaft, the axial pressure compensator may be provided with liquid guiding channels that guide liquid from the liquid inlet end of the internal channel to the nozzle head support shaft, while the axial forces resulting from liquid pressure of the liquid entering the high pressure nozzle are not transferred to the nozzle head support shaft. Instead the axial forces are guided through the axial pressure compensator and the housing.

The axial pressure compensator may comprise any suitable number of liquid guiding channels, for example 10 to 30 liquid guiding channels, that are preferably equally distributed over the circumference of the axial pressure compensator.

In an embodiment, the housing comprises a first housing part and a second housing part, wherein the axial pressure compensator is clamped between the first housing part and the second housing part. By clamping the axial pressure compensator between the first housing part and the second housing part, the relative position of the axial pressure compensator with respect to the housing is guaranteed. The clamping force can also be used to create a circumferential sealing between the housing and the axial pressure compensator.

In an embodiment, the first housing part and the second housing part are fixed on each other by a screw thread connection. A screw thread connection can advantageously be used to connect the first housing part and the second housing part to each other, whereby preferably the axial pressure compensator is arranged between the first housing part and the second housing part.

In an embodiment, the housing comprises a first support surface facing at least partially towards the liquid inlet end, wherein the axial pressure compensator comprises a second support surface placed against the first support surface. To absorb the axial forces exerted on the axial pressure compensator, the axial pressure compensator is arranged, in this embodiment, with its second support surface in axial direction against the first support surface of the housing, which in particular is provided in the housing part that is arranged at the liquid outlet end of the housing. The axial force can be transferred through the connection between the two housing parts to the liquid inlet end of the housing.

By guiding the axial force through the axial pressure compensator and the housing, it is avoided that the axial force is exerted on the nozzle head support shaft.

In an embodiment, the axial pressure compensator comprises a cylindrical bearing seat and the nozzle head support shaft comprises at one end a cylindrical outer bearing surface, wherein the cylindrical bearing seat rotatably receives the cylindrical outer bearing surface. The axial pressure compensator may comprise a cylindrical opening facing towards the nozzle head support shaft arranged to rotatably receive one end of the nozzle head support shaft. The cylindrical opening provides a cylindrical bearing seat in which a cylindrical outer bearing surface of the nozzle head support shaft may be received.

In an embodiment, the outlet openings of the liquid guiding channels of the axial pressure compensator are arranged in the cylindrical bearing seat. To transfer liquid from the axial pressure compensator to the nozzle head support shaft, the axial pressure compensator comprises liquid guiding channels, wherein each outlet opening of a guiding channel ends in the cylindrical bearing seat. Correspondingly, the liquid inlet openings of the liquid channel of the nozzle head support shaft are provided in the cylindrical outer bearing surface, whereby the liquid inlet openings of the liquid channel and the outlet openings of the liquid guiding channels of the axial pressure compensator are axially aligned with each other, such that liquid flowing out of the outlet openings may enter the liquid inlet openings of the liquid channel of the nozzle head support shaft.

In an alternative embodiment, the outlet openings of the liquid guiding channels end into a circumferential groove provided in the cylindrical bearing seat. In this embodiment, liquid flowing out of the outlet openings of the liquid guiding channels will first flow into a groove in the cylindrical bearing seat from which the liquid may flow into the liquid inlet openings of the liquid channel of the nozzle head support shaft.

In an embodiment, a diameter of the cylindrical bearing seat is larger than a diameter of cylindrical outer bearing surface such that, during use, a liquid bearing layer is created between the cylindrical bearing seat and the cylindrical outer bearing surface. A part of the liquid flowing out of the liquid outlet openings of the axial pressure compensator may be used to create a liquid bearing layer between the cylindrical bearing seat and the cylindrical outer bearing surface.

In an embodiment, the second housing part comprises a cylindrical inner bearing surface and wherein the nozzle head support shaft comprises a second cylindrical outer bearing surface which is aligned with the cylindrical inner bearing surface to form a second bearing for the nozzle head support shaft in the housing. The second bearing between the second housing part and the nozzle head support shaft provided as further support to the nozzle head support shaft to obtain an effective rotational support for the nozzle head support shaft.

The liquid that flows between the cylindrical bearing seat and the cylindrical outer bearing surface to form a liquid layer therebetween, or at least a part thereof, may flow further between the second cylindrical outer bearing surface and cylindrical inner bearing surface to form a second liquid bearing between the second housing part and the nozzle head support shaft.

In an embodiment, a diameter of the second cylindrical outer bearing surface is smaller than the diameter of the cylindrical outer bearing surface, wherein a circumferential shoulder connects the second cylindrical outer bearing surface and the cylindrical outer bearing surface, wherein a corresponding shoulder is provided in the housing to form an axial liquid bearing in direction of the liquid outlet end of the housing. To limit movement of the nozzle head support shaft in the direction of the liquid outlet end of the housing an axial liquid bearing may be provided. This axial liquid bearing may be created by the circumferential shoulder on the nozzle head support shaft and a corresponding circumferential shoulder in the housing, for example in the second housing part of the housing.

In an embodiment, the nozzle head support shaft comprises a rounded surface facing towards a flat surface of the axial pressure compensator to form an axial bearing in direction of the liquid inlet end. The flat surface may form a stop surface for axial movement of the nozzle head support shaft in the direction of the liquid inlet end of the high pressure nozzle.

The rounded surface of the nozzle head support shaft ensures that, in case of mechanical contact between the flat surface and the rounded surface, there will only be a small contact area between the flat surface and the rounded surface. In alternative embodiments, the axial surface may be conical instead of rounded to reduce the contact area between the nozzle head support shaft and the axial pressure compensator. The contact area is arranged at the axis of rotation to facilitate rotation of the nozzle head support shaft in the housing.

In an embodiment, the axial pressure compensator comprises a conical surface facing towards the liquid inlet end of the housing to distribute the flow of liquid over the circumference of the axial pressure compensator. It is desirable that the flow of liquid is equally distributed over the circumference of the axial pressure compensator. To this end a flow distributor may be provided at the side of the axial pressure compensator facing towards the liquid inlet end of the housing, this flow distributor is preferably a conical surface having its apex on the axis of rotation of the high pressure nozzle.

In an embodiment, the nozzle head comprises one or more jetting channels that are offset with respect to the axis of rotation of the nozzle head to provide a spinning effect to the nozzle head when liquid is jetted out of the jetting channels.

Embodiments of the invention will now be described, by way of example only, with reference to the accompanying schematic drawings in which corresponding reference symbols indicate corresponding parts, and in which.

Figure 1:
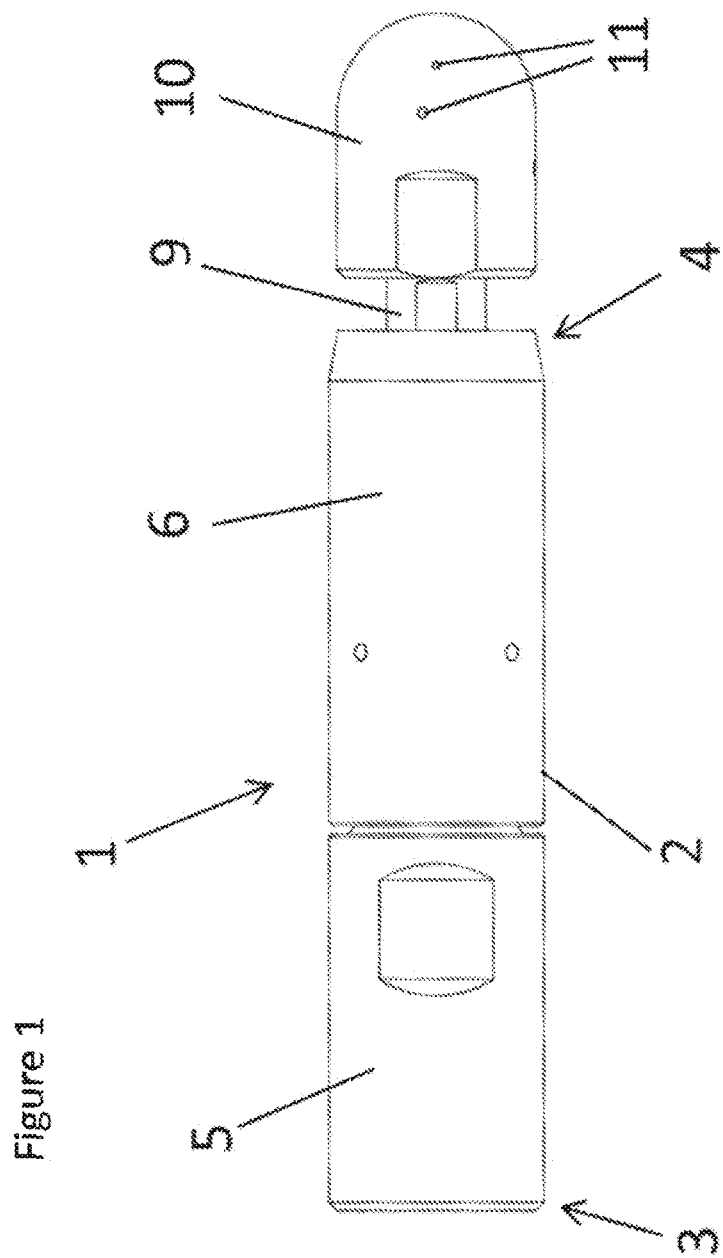
FIG. 1 shows a high pressure nozzle according to an embodiment of the invention.
Figure 2:
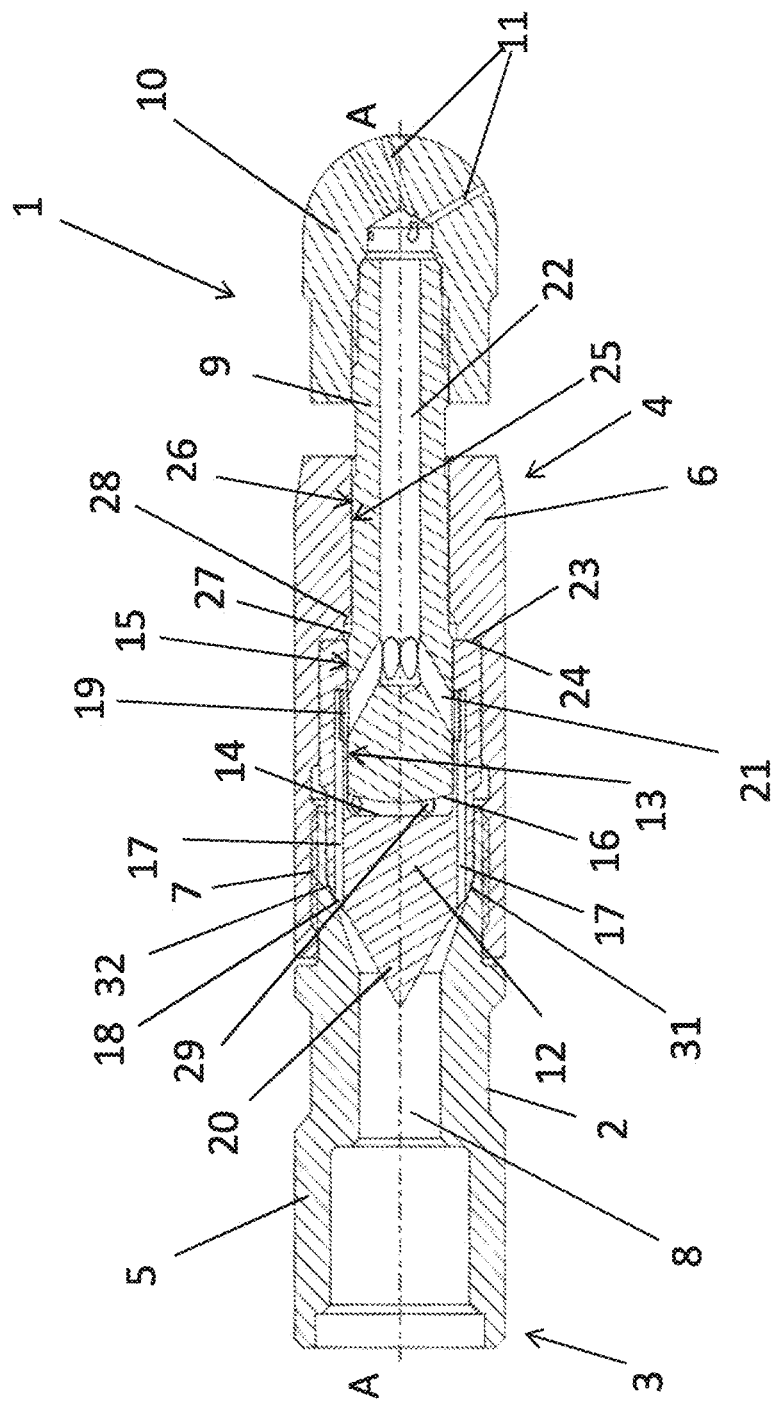
FIG. 2 shows a cross-section of the high pressure nozzle of FIG. 1.
Figure 3:
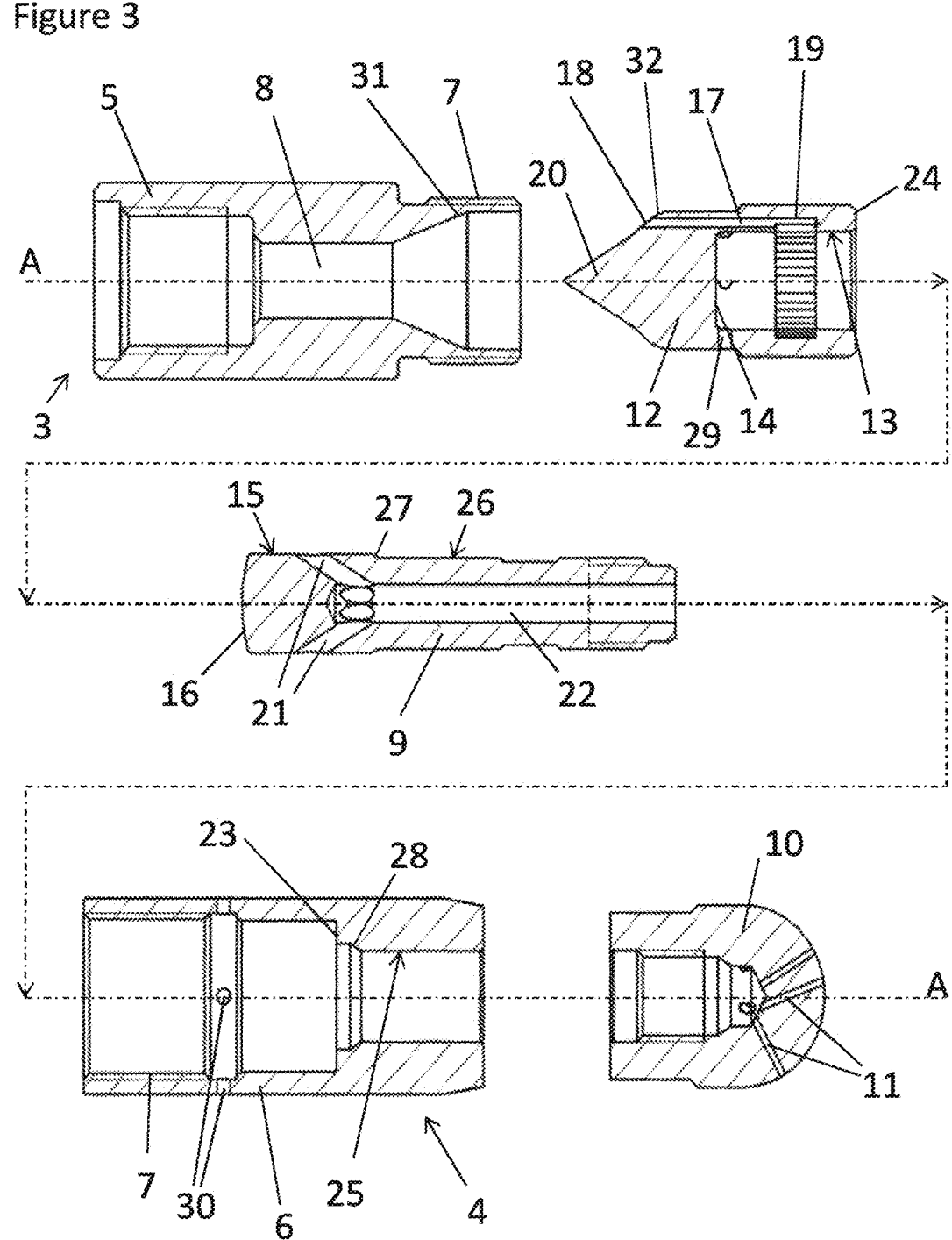
FIG. 3 shows an exploded view of the high pressure nozzle of FIG. 1, i.e. the parts of the high pressure nozzle in disassembled state.

FIG. 1 shows a high pressure nozzle, generally denoted by reference numeral 1. FIG. 2 shows a cross-section of the high pressure nozzle of FIG. 1. FIG. 3 shows an exploded view of the high pressure nozzle 1.

The high pressure nozzle 1 is a rotatable high pressure nozzle 1 configured to be mounted on a high pressure conduit of a high pressure cleaning device. Such high pressure cleaning device is typically used to clean internal surfaces of tubes, such as tubes of industrial heat exchangers, or other tubes of industrial systems, such as tubes of chemical plants. The high pressure conduit is typically connected to a high pressure source, such as a compressor that provides a liquid flow with pressures in the range of 250 bar to 4000 bar.

The high pressure nozzle 1 comprises a housing 2 comprising a liquid inlet end 3 and a liquid outlet end 4. The housing 2 comprises a first housing part 5 and a second housing part 6 that are connected to each other by a screw thread connection 7. The housing 2 defines an internal channel 8 that runs from the liquid inlet end 3 to the liquid outlet end 4.

The high pressure nozzle 1 further comprises a nozzle head support shaft 9 arranged partially in the internal channel 8. On the end of the nozzle head support shaft 9 that projects out of the housing 2 a nozzle head 10 is mounted. The nozzle head 10 is fixed to the nozzle head support shaft 9 by a screw thread connection. The nozzle head 10 is exchangeable for other nozzle heads 10, for example to replace the nozzle head 10 in view of wear or damage of the nozzle head 10, or to mount different types of nozzle heads in view of the desired jetting characteristics of the nozzle head 10.

The nozzle head support shaft 9 and the nozzle head 10 are rotatable with respect to the housing 2 about an axis of rotation A-A. The nozzle head 10 comprises one or more jetting channels 11. At least one of the one or more jetting channels 11 is offset with respect to the axis of rotation A-A. This means that the longitudinal axis of this at least one jetting channel 11 does not intersect with the axis of rotation A-A. As a result, due to the reaction force of liquid jetting from the at least one jetting channel 11, the nozzle head support shaft 9 and the nozzle head 10 will make a rotating movement. In practice, this rotating movement may have a high rotation speed.

In the internal channel 8, an axial pressure compensator 12 is provided. The axial pressure compensator 12 is clamped between the first housing part 5 and the second housing part 6 such that there is a sealing contact between a first sealing contact surface 31 of the first housing part 5 and a second sealing contact surface 32 of the axial pressure compensator 12 and also a sealing contact between a first support surface 23 of the second housing part 6 and a second support surface 24 of the axial pressure compensator 12.

The axial pressure compensator 12 comprises a cylindrical bearing seat 13 and an axial bearing surface 14 that form a bearing for the rotatable nozzle head support shaft 9. The nozzle head support shaft 9 comprises a cylindrical outer bearing surface 15 and a rounded axial surface 16. The cylindrical bearing seat 13 and the cylindrical outer bearing surface 15 form a rotational bearing for rotational support of the nozzle head support shaft 9 in the axial pressure compensator 12.

It is remarked that the diameter of the cylindrical outer bearing surface 15 of the nozzle head support shaft 9 is smaller than the diameter of the cylindrical bearing seat 13 such that there is some play between the cylindrical outer bearing surface 15 and the cylindrical bearing seat 13. During use the space between the cylindrical outer bearing surface 15 and the cylindrical bearing seat 13 will fill with liquid to create a liquid bearing layer that functions as a liquid layer to substantially reduce friction between the nozzle head support shaft 9 and the axial pressure compensator 12.

The axial bearing surface 14 of the axial pressure compensator is provided to support the rounded axial surface 16 of the nozzle head support shaft 9. When, during use, the reaction force of the jets that are ejected from the jetting channels push the nozzle head support shaft and the nozzle head 10 in the direction of the liquid inlet end 3 of the housing the axial bearing surface 14 and the rounded axial surface 16 function as an axial bearing for the nozzle head support shaft 9. The rounded shape of the rounded axial surface 16 has the advantage that there is a small contact area at the axis of rotation A-A between the axial bearing surface 14 and the rounded axial surface 16. In alternative embodiments, the axial surface 16 may be conical instead of rounded to reduce the contact area between the axial bearing surface 14 and the axial surface 16. Further the axial bearing surface 14 shown in the embodiment of FIGS. 1-3 is flat. The axial bearing surface 14 may however also be another shape, for example rounded with a larger radius than a radius of the rounded axial surface 16.

The axial pressure compensator 12 comprises a number, for example ten, liquid guiding channels 17 that run from a liquid inlet opening 18 to a liquid outlet opening 19. It is remarked that the liquid guiding channels 17 are the only liquid connections between the liquid inlet end and the liquid outlet end of the housing 2. The side of the axial pressure compensator 12 that is directed towards the liquid inlet end of the internal channel 8 of the housing has a conical projection 20 such that liquid is distributed over the circumference of the axial pressure compensator 12. The liquid inlet openings 18 are, in the shown embodiment, provided in the surface of the conical projection 20, while the liquid outlet openings 19 are provided in the cylindrical bearing seat 13.

During use liquid may be provided between the axial bearing surface 14 and the rounded axial surface 16 to provide a liquid bearing layer between these two surfaces, or to at least reduced the force with which the nozzle head support shaft 9 is pressed against the axial pressure compensator 12 in axial direction.

The liquid outlet openings 19 of the axial pressure compensator 12 are axially aligned with liquid inlet openings 21 of a liquid channel 22 of the nozzle head support shaft 9. The liquid inlet openings 21 are provided in the cylindrical outer bearing surface 15. The liquid channel 22 of the nozzle head support shaft 9 is in fluid communication with the jetting channels 11 of the nozzle head such that liquid entering the liquid channel 22 can be jetted from the jetting channels 11. It is remarked that the nozzle head support shaft 9 may have multiple liquid inlet openings 21 distributed over the circumference of the nozzle head support shaft 9 at an axial position substantially aligned with the liquid outlet openings 19 of the axial pressure compensator 12. The nozzle head support shaft 11 may for example have four to ten liquid inlet openings 21.

The axial pressure compensator 12 is arranged to compensate axial pressure that is exerted by liquid entering the liquid channel 8 at the liquid inlet end 3. To compensate this axial force, the second housing part 6 is arranged with the first support surface 23 against the second support surface 24 of the axial pressure compensator 12. Since the axial force is received by the second housing part 6, the axial force is not transferred to the nozzle head support shaft 9.

To further rotatably support the nozzle head support shaft 9 in the housing 2, the second housing part 6 comprises a cylindrical inner bearing surface 25 and the nozzle head support shaft 9 comprises a second cylindrical outer bearing surface 26 which is aligned with the cylindrical inner bearing surface 25 to form a second bearing for the nozzle head support shaft 9 in the housing 2. The diameter of the cylindrical inner bearing surface 25 is larger than the second cylindrical outer bearing surface 26 such that, during use, a liquid layer can be created between the cylindrical inner bearing surface 25 and second cylindrical outer bearing surface 26 to form a liquid bearing to rotatably support the nozzle head support shaft 9 in the second housing part 6.

The diameter of the cylindrical outer bearing surface 15 is larger than the diameter of the second cylindrical outer bearing surface 26. Between the cylindrical outer bearing surface 15 and the second cylindrical outer bearing surface 26 a circumferential shoulder 27 is provided with which the diameter decreases from the diameter of the cylindrical outer bearing surface 15 to the diameter of the second cylindrical outer bearing surface 26. The second housing part 6 comprises a circumferential second shoulder 28 with a corresponding decrease in diameter of the internal channel 8. As a result, the second shoulder 28 functions as an axial stop surface for movement of the nozzle head support shaft 9 in the axial direction in the direction of the liquid outlet end of the internal channel 8.

Movement in the axial direction of the nozzle head support shaft 9 is therefore limited, in the direction of the liquid inlet end 3, by the axial surface 14 of the axial pressure compensator 12 and, in the direction of the liquid outlet end 4, by the circumferential second shoulder 28 provided in the second housing part 6.

When the high pressure nozzle 1 is connected at the liquid inlet end to a high pressure liquid source, the liquid will flow into the internal channel 8, where the liquid will be distributed at the conical projection 20 over the circumference of the axial pressure compensator 20. At the liquid inlet openings 18 the liquid will flow into the liquid guiding channels 17 towards the liquid outlet openings 19 that are provided in the cylindrical bearing seat 13. Most of the liquid that flows out of the liquid outlet openings 19 will flow through the liquid inlet openings 21 of the nozzle head support shaft 9 into the liquid channel 22.

From the liquid channel 22, the liquid will flow to the jetting channels 11 of the nozzle head 10, where the liquid will be jetted out of the nozzle head 10 to provide a cleaning jet that can be used for cleaning purposes. As a consequence of the direction of at least one of the jetting channels 10, offset with respect to the axis of rotation A-A, the nozzle head 10 together with the nozzle head support shaft 9 will make a spinning movement. This results in a rotating spraying of liquid jetted from the rotary nozzle head 10. This further improves the cleaning effect of the cleaning jets that are jetted out of the jetting channels 11.

A limited part of the liquid that flows out of the liquid outlet openings 19, for example less than 25% of the total liquid consumed by the high pressure nozzle 1 will be used for a liquid bearing of the nozzle head support shaft 9. This liquid will flow from the liquid outlet openings 19 to the space between the cylindrical bearing seat 13 of the axial pressure compensator 12 and the cylindrical outer bearing surface 15 of the nozzle head support shaft 9. A part of this liquid will flow in the direction of the liquid inlet end 3 of the housing 2, while another part will flow in the direction of the liquid outlet end 4 of the housing 2.

The part that will flow in the direction of the liquid inlet end 3 will come into the space between the axial bearing surface 14 and the rounded axial surface 16 where the liquid may also be used to provide a liquid layer between the axial bearing surface 14 and the rounded axial surface 16. From this space the liquid may flow out of the high pressure nozzle 1 via outlet channels 29 in the axial pressure compensator 12 and outlet channels 30 in the second housing part 6.

The part of the liquid that will flow in the direction of the liquid outlet end 4 of the housing 2 will flow between the circumferential shoulder 27 and the second circumferential shoulder 28 to provide an axial liquid bearing layer between these two shoulders 27, 28, and from there between the cylindrical inner bearing surface 25 and the second cylindrical outer bearing surface 26 to form a rotational liquid bearing layer. At the liquid outlet end 4 of the housing 2 the liquid will flow out of the high pressure nozzle 1.

The rotary liquid bearings created by a liquid layer between the cylindrical bearing seat 13 and the cylindrical outer bearing surface 15 and between the cylindrical inner bearing surface 25 and the second cylindrical outer bearing surface 26, respectively, provide an effective rotation support for the nozzle head support shaft 9 and therewith the nozzle head 10 mounted on the nozzle head support shaft 9. Also, the axial liquid bearings between the axial bearing surface 14 and the rounded axial surface 16 in one direction and between the circumferential shoulder 27 and the second circumferential shoulder 28 in the opposite direction provide an effective support in the axial directions.

The axial pressure compensator 12 at the same time ensures that the axial pressure on the high pressure nozzle 1 resulting from the high pressure liquid entering the high pressure nozzle is received by the axial pressure compensator 21 and transferred to the housing 2 through the first support surface 23 and the second support surface 24 so that the force is not exerted on the nozzle head support shaft 9. Thus, the axial liquid bearing between the circumferential shoulder 27 and the second circumferential shoulder 28 does not have to withstand this axial pressure of the liquid entering the high pressure nozzle 1 at the liquid inlet end 3.

This allows a less complex construction of the high pressure nozzle 1, while the rotary liquid bearings and the axial liquid bearings as discussed above provide sufficient bearing capacity to use different types of nozzle heads 10 having different jetting channel configurations without the need of using a relatively large percentage of the water flow through the high pressure nozzle 1 to provide liquid bearing layers for the rotary and/or axial bearing support of the nozzle head support shaft 9.

It will be clear for the man skilled in the art that many modifications may be made to adapt the high pressure nozzle to specific circumstances of the application of the high pressure nozzle.

REFERENCE NUMERALS 1 high pressure nozzle
2 housing
3 liquid inlet end
4 liquid outlet end
5 first housing part
6 second housing part
7 screw thread connection
8 internal channel 9 nozzle head support shaft
10 nozzle head
11 jetting channel
12 axial pressure compensator
13 cylindrical bearing seat
14 axial bearing surface
15 cylindrical outer bearing surface
16 rounded axial surface
17 liquid guiding channel
18 liquid inlet opening
19 liquid outlet opening
20 conical projection
21 liquid inlet opening
22 liquid channel
23 first support surface
24 second support surface
25 cylindrical inner bearing surface
26 second cylindrical outer bearing surface
27 circumferential shoulder
28 second circumferential shoulder
29 outlet channel
30 outlet channel
31 first sealing contact surface
32 second sealing contact surface
A-A axis of rotation

The invention claimed is:

1. A nozzle, comprising:
a longitudinal housing having a liquid inlet end and a liquid outlet end opposite to the liquid inlet end and comprising an internal channel running from the liquid inlet end to the liquid outlet end,
a nozzle head support shaft, rotatably arranged partially in the internal channel and comprising a liquid channel in fluid communication with the internal channel, and
a rotary nozzle head supported on the nozzle head support shaft and arranged outside of the longitudinal housing, wherein the rotary nozzle head is arranged to rotate about a longitudinal axis of rotation to provide a rotating spraying of liquid jetted from the rotary nozzle head, and
an axial pressure compensator arranged in the internal channel,
wherein the axial pressure compensator is arranged to prevent transfer of an axial pressure force from liquid entering the internal channel at the liquid inlet end to the nozzle head support shaft,
wherein the axial pressure compensator comprises a cylindrical bearing seat having a first cylindrical inner bearing surface and the nozzle head support shaft comprises at one end a first cylindrical outer bearing surface, and
wherein the first cylindrical inner bearing surface rotatably receives the first cylindrical outer bearing surface,
wherein the axial pressure compensator comprises a plurality of liquid guiding channels, an inlet opening of each liquid guiding channel being in fluid communication with the liquid inlet end and an outlet opening of each liquid guiding channel being in fluid communication with the liquid channel of the nozzle head support shaft,
wherein the outlet openings of the liquid guiding channels of the axial pressure compensator are arranged in the first cylindrical inner bearing surface,
wherein liquid inlet openings of the liquid channel of the nozzle head support shaft are provided in the first cylindrical outer bearing surface, and
wherein the liquid inlet openings of the liquid channel of the nozzle head support shaft and the outlet openings of the liquid guiding channels of the axial pressure compensator are axially aligned with each other.

2. The nozzle of claim 1, wherein the longitudinal housing comprises a first housing part and a second housing part, wherein the axial pressure compensator is clamped between the first housing part and the second housing part.

3. The nozzle of claim 2, wherein the first housing part and the second housing part are fixed on each other by a screw thread connection.

4. The nozzle of claim 1, wherein the longitudinal housing comprises a first support surface facing at least partially towards the liquid inlet end, wherein the axial pressure compensator comprises a second support surface placed against the first support surface.

5. The nozzle of claim 1, wherein a diameter of the cylindrical bearing seat is larger than a diameter of the first cylindrical outer bearing surface such that, during use, a liquid bearing layer is created between the cylindrical bearing seat and the first cylindrical outer bearing surface.

6. The nozzle of claim 1, wherein the second housing part comprises a second cylindrical inner bearing surface and wherein the nozzle head support shaft comprises a second cylindrical outer bearing surface which is aligned with the second cylindrical inner bearing surface to form a second bearing for the nozzle head support shaft in the longitudinal housing.

7. The nozzle of claim 6, wherein a diameter of the second cylindrical outer bearing surface is smaller than the diameter of the first cylindrical outer bearing surface, wherein a circumferential shoulder connects the second cylindrical outer bearing surface and the first cylindrical outer bearing surface, wherein a corresponding shoulder is provided in the housing to form an axial liquid bearing in a direction of the liquid outlet end of the longitudinal housing.

8. The nozzle of claim 1, wherein the nozzle head support shaft comprises a rounded surface facing towards a flat surface of the axial pressure compensator to form an axial bearing in a direction of the liquid inlet end.

9. The nozzle of claim 1, wherein the axial pressure compensator comprises a conical surface facing towards the liquid inlet end to distribute a flow of liquid over a circumference of the axial pressure compensator.

10. The nozzle of claim 1, wherein the nozzle head comprises one or more jetting channels that are offset with respect to the axis of rotation of the nozzle head.

11. The nozzle of claim 1, wherein a diameter of the second cylindrical outer bearing surface is smaller than a diameter of the first cylindrical outer bearing surface, wherein a circumferential shoulder connects the second cylindrical outer bearing surface and the first cylindrical outer bearing surface, wherein a corresponding shoulder is provided in the housing to form an axial liquid bearing in a direction of the liquid outlet end of the longitudinal housing.

* * * * *